June 3, 1941.  F. C. FULCHER  2,243,900

FLEXIBLE DRIVING COUPLING

Filed May 24, 1939  2 Sheets-Sheet 1

Inventor
Frank Christian Fulcher
by Albert F. Nathan
Attorney

June 3, 1941. F. C. FULCHER 2,243,900
FLEXIBLE DRIVING COUPLING
Filed May 24, 1939 2 Sheets-Sheet 2
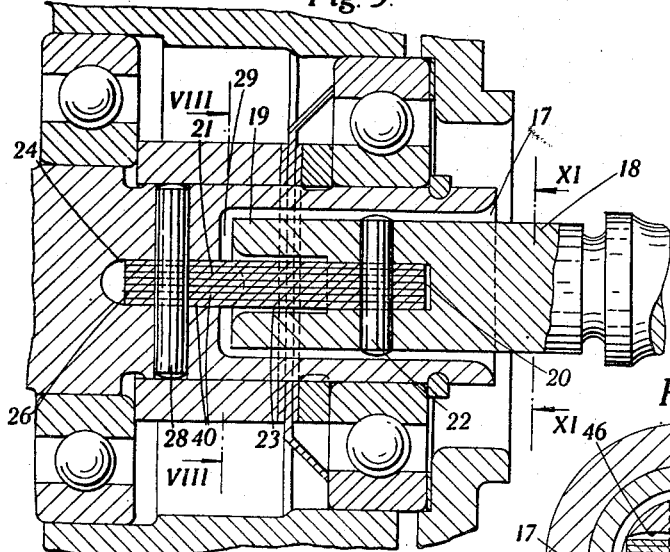
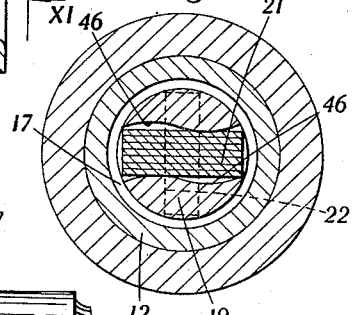
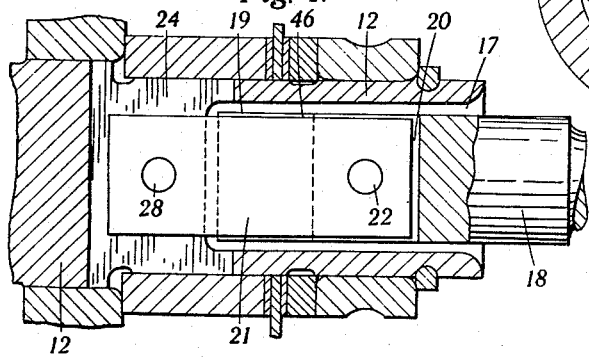
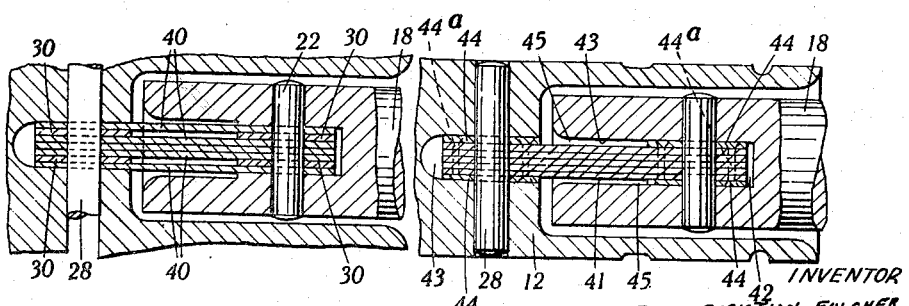
INVENTOR
FRANK CHRISTIAN FULCHER
BY
Albert F. Nathan
ATTORNEY Patented June 3, 1941

2,243,900

UNITED STATES PATENT OFFICE 2,243,900

FLEXIBLE DRIVING COUPLING

Frank Christian Fulcher, Purley, England

Application May 24, 1939, Serial No. 275,456
In Great Britain October 12, 1938

12 Claims. (Cl. 64—15)

The present invention relates to elastic couplings for connecting rotary parts for drive the one from the other of the kind in which a laminated elastic driving coupling is arranged on the axis of the rotary parts and is especially suited for high speed rotary pumps and other purposes where it is desirable not only to avoid shock but to absorb torsional vibrations and reduce the power absorbed by malalignment of the driving and driven shafts.

A laminated elastic driving coupling according to the present invention is particularly advantageous for diminishing the risk of fracture or fatigue failure of high speed rotary vane vacuum pumps the subject of my co-pending applications Serial Nos. 275,453, 275,454 and 275,455, all filed on May 24, 1939.

The principal object of the present invention is to provide a laminated elastic coupling, e. g., a laminated steel spring coupling, of the kind above described, which shall establish an amount of flexibility in the connection between the driving and driven shafts when starting the machine that is considerably in excess of that which is required when running at full speed and load.

To this end the present invention broadly consists of a laminated elastic driving coupling, e. g., a laminated steel spring driving coupling, of the kind above described which is attached to the driving and driven rotary members so as to leave a medial portion free to be twisted by relative rotation between the members which following a predetermined relative rotation limits the twisting of a part of such portion leaving a part which is free to twist to the limit of its own torsional resistance while the drive is operating at the working speed and load. Thus the coupling commences to transmit the drive with a long medial portion and subsequently transmits the drive with a shorter medial portion and preferably the part of the medial portion which is free for the limited twist is longer than the remaining part thereof.

The invention may conveniently and advantageously be carried into practical effect by fitting the ends of the coupling spring snugly in axial slots in the facing ends of the driving and driven members while leaving a comparatively short part of a medial portion of the spring bridging a short gap between such members and a comparatively long part of such medial portion free for limited torsional deflection between the sides of the slotted part of at least one of such members.

A pivoted connection of the elastic coupling to the respective members is in general preferred as is also the projection of the coupled members the one into the other.

The amount of flexibility of the spring coupling may be altered by varying the length of the whole medial portion, by varying the ratio of long to short parts of the medial portion, or by reducing the number of or weakening the laminations over the medial portion, or by any, some or all of these methods.

As hereinafter described as applied to a high speed rotary vane vacuum pump for use on aircraft the spring coupling pivotally connects the rotary part of the pump to a driving member which projects into a recess in the journal of the pump rotor, one end of the spring snugly fitting an axial slot extending diametrically through the rotor journal at the bottom of the recess and the other end of the spring snugly fitting the inner portion of an axial slot in the driving member but being spaced from the sides of the outer portion thereof either by widening the slot at this part or by shimming methods.

In order that the present invention may be the more readily understood reference is hereinafter made to the constructional forms of the invention as applied to driving a pump of the kind described in my co-pending U. S. patent application Serial No. 275,454 to which reference is made above, will now be described by way of example with reference to the accompanying drawings in which—

Fig. 3 shows a sectional detail view, drawn to a larger scale, of the flexible drive-transmitting coupling shown in Fig. 1.

Fig. 4 is a part sectional plan view of the coupling shown in Fig. 3.

Fig. 5 is a detail view of a modified construction of the torque-transmitting member.

Fig. 7 is a detail view of an alternative arrangement of the torque-transmitting member.

Fig. 8 is a cross-sectional detail showing an alternative form of the sidewalls of the clearance slot containing the torque transmitting member.

Figure 1:
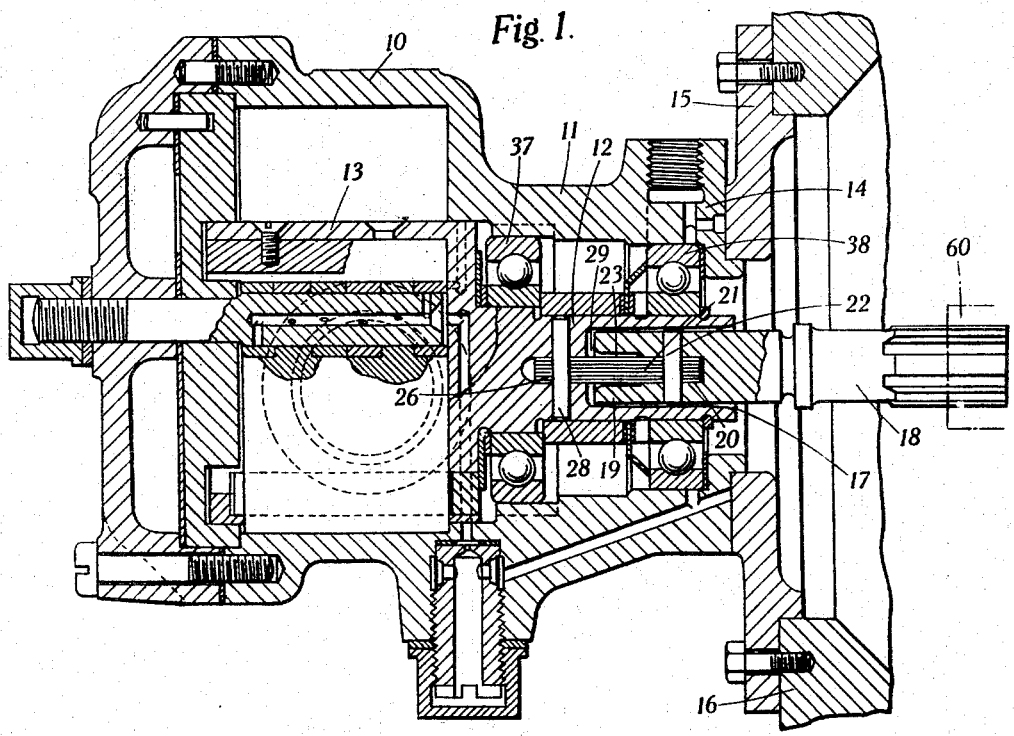
Fig. 1 is a sectional, side elevation of the rotary vane pump hereinbefore referred to as particularly constructed for duty as a vacuum pump on aircraft for the operation of suction driven flight instruments and gyro-pilots and to provide ample discharge pressure for the operation of de-icer equipment, incorporating a laminated elastic coupling constructed according to the present invention.
Figure 2:
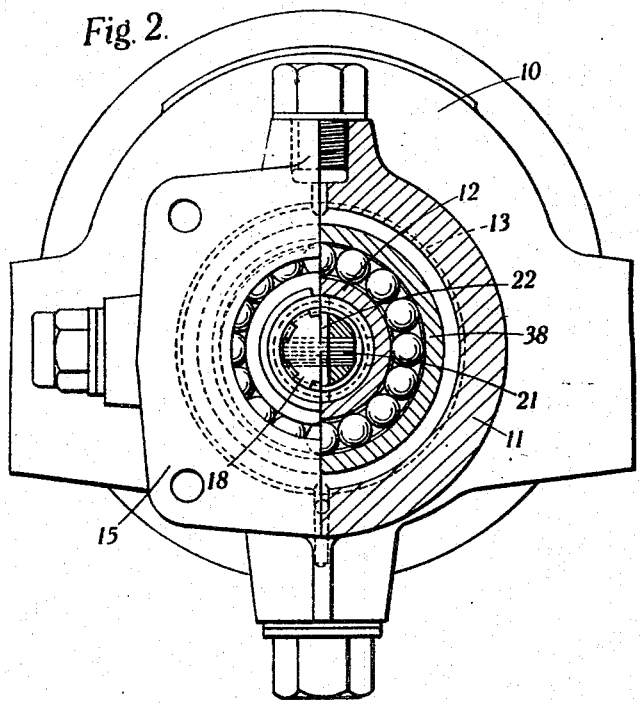
Fig. 2 is a part sectional elevation of the driving end of the pump.
Figure 9:
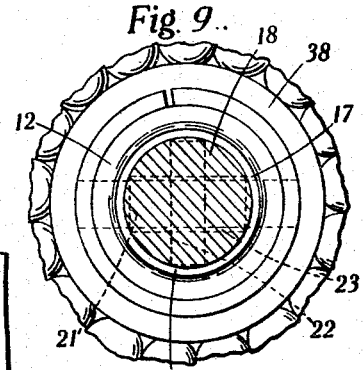
Fig. 9 is a cross sectional view taken on line XI—XI of Fig. 3.

The general construction of the pump shown in Fig. 1 is similar to that fully disclosed in my co-pending U. S. patent application Serial No. 275,454, and since it forms no part of the present invention it need only be briefly described herein.

The pump comprises a casing 10 having a neck 11 in which the journal 12 of the rotor 13 is mounted cantilever fashion in ball bearings 37, 38 as described in my co-pending U. S. patent application Serial No. 275,454.

The free end of casing neck 11 is provided with a spigoted mounting flange 14, which engages an adaptor pad 15, the latter being adapted for mounting upon, for example, the crankcase 16 of an internal combustion engine so that the pump may conveniently be driven from an accessory drive shaft 60 within the engine crankcase as indicated in chain-dot outline in Fig. 1.

In such a pump the rotary parts to be connected are the outer end of journal 12 and a driving member which in the illustrated example is a pin and socket piece 18. In carrying the present invention into practical effect as shewn in Figs. 1 to 4 and Figs 6 and 9, the journal is provided with a co-axial recess 17 for the reception of the facing end of piece 18 which projects through the crankcase 16 and has its outer end splined for engagement with the driving member 60 within the crankcase.

Sufficient play is left between the preferably cylindrical recess 17 of the journal 12 and the intruding preferably cylindrical end 19 of the driving piece 18 as to permit of a malalignment of the rotary parts and to allow these to displace angularly with respect to one another.

The end 19 of piece 18 is bifurcated by a coaxial slot 20 the inner end of which is adapted to receive one end of a co-axially arranged laminated steel spring 21 which is of rectangular section and engages the inner portion of slot 20 with a sliding fit and is retained therein by a pivot pin 22 which passes through the pin 18 and coupling 21 at right angles to the general plane of the coupling 21.

The outer portion of slot 20 is made somewhat wider than the inner portion to provide clearances 23 between such outer portion and the sides of the coupling 21 so as to permit a limited amount of twisting of the coupling within such outer portion.

A co-axial slot 24 is formed through the journal 12 so as to open into the recess 17, such slot 24 equalling in width the inner end of slot 20 and receiving that end 26 of coupling 21 which projects from driving piece 18. The end of the coupling 21 engages in slot 24 with a sliding fit and is retained therein by a pin 28 which passes through coupling 21 parallel with the pin 22.

The coupling 21 comprises a series of flat blade springs 40 of such shape that when laid over one another a laminated elastic coupling is formed which is wider than thick.

A gap 29 is left between the facing ends of the walls of the slots 24 and 20 in the end of journal 12 and piece 18 respectively.

Along the wider portion of the slot 20 and across the gap 29 the coupling 21 provides a long medial portion which is free to twist when the coupling commences to transmit the drive, but when the portion of the elastic coupling lying in the wider portion of the slot becomes twisted into contact therewith the drive is then transmitted by the comparatively short medial portion of the coupling which bridges the gap 29, whereby for starting the machine when the inertia of the various moving parts must be overcome a highly flexible transmission is effected, but after the inertia of the parts has been overcome the drive is then less flexibly transmitted but still in such a manner as to absorb torsional vibrations and reduce the power absorbed by malalignment of the driving and driven shafts. The flexibility of the drive at the working speed and load for a given elastic coupling will vary with the width of the gap.

The general flexibility of the coupling may be varied by reducing the number of laminations in the coupling 21. As shown in Fig. 5 for example, two of the full length leaves 40 are removed and in place thereof a pair of packing pieces or shortened leaves 30 of equivalent thickness are inserted to maintain the requisite thickness of the ends of member 21 which fit in slots 20 and 24. When so arranged, the extremities of the coupling 21 make a contacting fit in the slots 20, 24, while a space or spaces are left between the full length leaves intermediate the length thereof.

Referring to Fig. 7, a modified arrangement of the coupling 21 comprises a plurality of leaves 41, the total thickness of which is less than the width of slots 42, 43 formed in the driving link 18 and barrel axle 12 respectively. External shims 44, positioned at the ends of the member 21 and preferably secured thereto e. g. by rivets 44a which pass through the opposed faces of the shims and leaves, increase the overall thickness of the ends of member 21 so that the said ends fit snugly in the slots 42, 43. The shims 44 also serve to space coupling 21 from the sides of the outer part of slot 42 so that clearances 45 are left between the sides of the member 21 and slot 42 to permit limited twist of that part of the coupling 21 which lies between the wider part of the slot. The use of shims in the journal slot 24 may if desired, be avoided by making that slot of narrower width.

It will be seen from Fig. 7, that when external shims are used to fit the end of the coupling into slots 42, it is not necessary to widen the outer end of these in order to provide the clearances 45.

Figure 6:
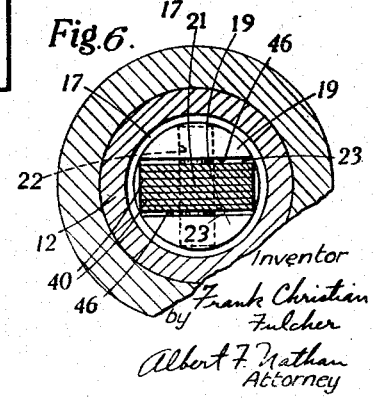
Fig. 6 is a fragmentary cross-sectional view taken on line VIII—VIII of Fig. 3.

Although the walls 46 of the outer widened portion of the slot in the driving piece 18 may conveniently be plane as shown in Fig. 6 of the drawings, they may be shaped to follow the configuration which the medial portion of the coupling 21 assumes when twisted to the desired amount.

Any suitable or approved means of the driving piece 18 for drive may be adopted. For example, splining as shown in Fig. 1.

I claim:

1. An elastic coupling device comprising coaxial rotary driving and driven members and a laminated coupling arranged on the axis thereof, said coupling being attached to said members and having a medial portion free to be twisted about the axis of said members by relative rotation of said members, stop means on at least one of said members operative after a predetermined amount of relative rotation to limit the twisting of part of said medial portion, said means being arranged to leave another part of said medial portion free for further twisting to a limit determined only by its own torsional resistance.

2. An elastic coupling device comprising a rotary driving member, a rotary driven member and a laminated coupling attached to said members and having a medial portion which is free to be twisted by relative rotation between said members, stop means on at least one of said members operative after a predetermined amount of said relative rotation to limit the twisting of a part of said medial portion, said means being arranged to leave a shorter part of said medial portion which is free for further twisting.

3. An elastic coupling device comprising a rotary driving member and a rotary driven member, axially arranged slots in the facing ends of said members, said ends being spaced from each other to form a gap, and a laminated coupling snugly fitting at one end in the axial slot in one member and at the other end in the axial slot in the other member and bridging the said gap, a medial part of the coupling on at least one side of the portion which bridges the gap being spaced from each side of the outer portion of the corresponding axial slot so as to form a narrow groove which is axially longer than the axial length of said gap, a medial portion of the coupling being therefore free to be twisted within said outer slot portion by relative rotation between said members to an amount limited to the width of said narrow grooves, the short portion of the coupling bridging said gap being free for further twisting to an extent limited only by its own torsional resistance.

4. An elastic coupling device comprising a rotary driving member, a rotary driven member, axially arranged slots in the facing ends of said members, said ends being spaced from each other so as to form a gap, and a laminated coupling snugly fitting at one end in the axial slot in one member and at the other end in the axial slot in the other member and bridging the said gap, the slot in at least one of said members having a wider outer portion so as to leave between each side of the corresponding portion of the laminated coupling and the opposite walls of said widened portion of the slot a narrow groove which is axially longer than the axial length of said gap, a medial portion of the coupling being therefore free to be twisted within said widened slot portion by relative rotation between said members to an amount predetermined by the width of said narrow grooves, the short portion of the coupling bridging said gap being free for further twisting to an extent limited only by its own torsional resistance.

5. An elastic coupling device comprising a rotary driving member and a rotary driven member, axially arranged slots in the facing ends of said members, said ends being spaced from each other to form a gap, and a laminated coupling snugly fitting at one end in the axial slot in one member and at the other end in the axial slot in the other member and bridging the said gap, end shims which space a medial part of the coupling on at least one side of the portion which bridges the gap from each side of the outer portion of the corresponding axial slot so as to form a narrow groove which is axially longer than the axial length of said gap, a medial portion of the coupling being therefore free to be twisted within said outer slot portion by relative rotation between said members to an amount limited to the width of said narrow grooves, the short portion of the coupling bridging said gap being free for further twisting to an extent limited only by its own torsional resistance.

6. An elastic coupling device comprising a rotary driving member, a rotary driven member and an elastic coupling on the axis of said members, said coupling comprising multiple flat steel strips laid one over the other, a medial portion of the coupling being more readily twisted than the end portions, said end portions being attached to said members, said medial portion being free to be twisted by relative rotation between said members, stop means on at least one of said members operative after a predetermined amount of said relative rotation to limit the twisting of a part of said medial portion, said means being arranged to leave a shorter part of said medial portion which is free for further twisting to a limit determined only by its own torsional resistance.

7. An elastic coupling device according to claim 6, in which the said medial portion is comprised of a smaller number of steel strips than the end portions.

8. An elastic coupling device comprising rotary driving and driven members, said members having axial slots opening at the facing ends of said members, an elastic coupling comprising multiple steel strips and spacing strips arranged between adjacent strips to leave gaps between the strips over the medial portion of the coupling, said end portions of the coupling including said spacing strips being fitted into said slots and said medial portion being free to be twisted by relative rotation between said members, stop means on at least one of said members operative after a predetermined amount of said relative rotation to limit the twisting of a part of said medial portion, said means being arranged to leave a shorter part of said medial portion which is free for further twisting to a limit determined only by its own torsional resistance.

9. An elastic coupling device comprising a rotary driving member and a rotary driven member, one of said members having a socket in its end face into which the end of the other member intrudes, an axial slot in the bottom of said socket and an axial slot in said intruding end, the bottom of said socket and the inner end of said intruding portion being spaced to form a gap therebetween, a laminated coupling fitting snugly at one end in one of said slots and at the other end in the other slot and having a medial portion which is free to be twisted by relative rotation between said members, a part of said medial portion extending into at least one of said slots with freedom to twist therein, stop means on at least one of said members operative after a predetermined amount of said relative rotation to limit the twisting of that part of said medial portion extending into the slot, the part of said medial portion which bridges said gap being left free for further twisting to an amount limited only by its own torsional resistance.

10. An elastic coupling device according to claim 9, in which play is provided between said socket and said intruding end to permit relative pivotal movement of the driving and driven members.

11. An elastic coupling device comprising a rotary driving member, a rotary driven member and a laminated coupling arranged on the axis of said members, said coupling being attached to said members and having a medial portion which is free to be twisted by relative rotation between said members, said coupling being pivotally attached to at least one of said members, stop means on at least one of said members operative after a predetermined amount of said relative rotation to limit the twisting of a part of said medial portion, said means being arranged to leave a shorter part of said medial portion which is free for further twisting.

12. An elastic coupling according to claim 11, in which said walls are shaped to follow the configuration of the corresponding part of the medial portion of the coupling when twisted into contact therewith.

FRANK CHRISTIAN FULCHER.